United States Patent

[11] 3,607,921

[72] Inventors Arnold F. Stancell
 Highland;
 Clairborne A. Duval, Jr, Westfield, both of N.J.
[21] Appl. No. 736,252
[22] Filed June 12, 1968
[45] Patented Sept. 21, 1971
[73] Assignee Mobil Oil Corporation

[54] CATALYTIC PURIFICATION OF TEREPHTHALIC ACID
 16 Claims, No Drawings
[52] U.S. Cl. .................................................... 260/525
[51] Int. Cl. .................................................... C07c 51/42
[50] Field of Search ........................................ 260/525

[56] References Cited
 UNITED STATES PATENTS
 3,115,521 12/1963 Swakon .................. 260/525

FOREIGN PATENTS
 597,876 5/1960 Canada .................. 260/525
 726,213 1/1966 Canada .................. 260/525

OTHER REFERENCES

Sabatier, " La Catalyse en Chimie Organique," 1920, pages 199-200.

*Primary Examiner*—Lewis Gotts
*Assistant Examiner*—R. S. Weissberg
*Attorneys*—Olswald G. Hayes, Donald L. Dickerson and James F. Snowden

ABSTRACT: Crude terephthalic acid is purified at elevated temperatures by contact in the presence of carbon monoxide with solid particles of an adsorptive agent having substantial carbon monoxide sorption capacity (e.g., palladium on a carbon support) to obtain a high recovery of the purified acid while effecting a high percentage conversion of the small amounts of para-carboxybenzaldehyde contaminating the crude acid. In at least some instances, small amounts of hydrogen may be charged to increase the catalyst life; and steam or another inert gaseous carrier is desirably employed in vapor phase operations.

CATALYTIC PURIFICATION OF TEREPHTHALIC ACID

BACKGROUND OF THE INVENTION

1. Field of the Invention

This invention relates to an improved method for the purification of crude terephthalic acid contaminated with a minor proportion of p-carboxybenzaldehyde wherein the latter is converted into substances which are readily separable from the terephthalic acid.

2. Description of the Prior Art

Terephthalic acid is a compound of increasing commercial importance as exemplified by its use in large quantities in the production of fiber and film-forming polyesters, such as polyethylene terephthalate of high molecular weight. For many purposes, including the use of such polyesters in textile fibers and magnetic tape bases, an extremely high degree of polymer purity is necessary to obtain the desired color, dyeing characteristics and/or excellent physical and electrical properties. Heretofore, most commercial production of such pure polyesters has involved an indirect route of conversion of the terephthalic acid to its dimethyl ester and purification of the ester by recrystallization or distillation prior to transesterification of the dimethyl ester with a glycol (e.g. ethylene glycol) and polymerization of the transesterification product. More recently, it has been found advantageous to directly esterify terephthalic acid of high purity with the glycol; hence efficient and economical methods for the purification of terephthalic acid per se are now of prime importance.

Terephthalic acid can be manufactured by several processes known in the art, as exemplified by the catalytic oxidation of p-xylene according to the processes described in U.S. Pat. Nos. 2,833,816, 2,853,514, 3,036,122 and others.

The major impurities present in terephthalic acid prepared by the catalytic oxidation of p-xylene result from incomplete oxidation; and the crude product generally contains about 0.5 to 3 percent of p-carboxybenzaldehyde as well as other intermediate oxidation byproducts, usually including p-toluic acid. Leaching of this crude product with hot acetic acid or another suitable agent may be employed to reduce the content of such impurities and provide a leached crude material typically containing about 0.2 to 1.5 percent p-carboxybenzaldehyde. Also, a much smaller amount of ash is typically present in the form of one or more metal compounds derived from the residue of a metal salt oxidation catalyst (e.g. cobalt acetate tetrahydrate) and/or the corrosion of process equipment, silica and organic decomposition products.

A particularly troublesome byproduct of p-xylene oxidation is p-carboxybenzaldehyde which acts as a chain stopper during subsequent polyesterification of the terephthalic acid and, either alone or in combination with other intermediate oxidation products, imparts undesirable coloration to the resulting polyester product. Moreover, it is difficult to remove this aldehyde compound from terephthalic acid by conventional techniques, particularly in meeting commercial specifications for a maximum p-carboxybenzaldehyde content in the range of 15 to 50 parts per million (p.p.m.) by weight.

Various procedures have been proposed for the purification of terephthalic acid including fractional recrystallization, leaching, sublimation with fractional condensation and contact with a hydrogenation catalyst (e.g. palladium) in the presence of hydrogen, but most of these methods have their limitations in respect to effectiveness, cost or operating difficulties encountered.

SUMMARY OF THE INVENTION

The present invention is a method for the purification of crude terephthalic acids contaminated with a minor amount of p-carboxybenzaldehyde wherein a dispersion of the crude acid is treated in the presence of carbon monoxide by contact with the particles of a solid adsorptive agent which is capable of absorbing a substantial amount of carbon monoxide and the resulting treated product has a substantially lower p-carboxybenzaldehyde content than the crude acid.

Other aspects of the invention relate to suitable contact agents, especially the metals in Group VIII of the Periodic Table of Elements of which palladium is preferred; treating the crude acid while in the vapor state at a temperature above its dew point in the reaction mixture and below the temperature level at which substantial decomposition of the terephthalic acid occurs during the treatment; introducing a substantial amount of an inert gaseous carrier, such as steam, to entrain the fine particles of the acid during vaporization; the subsequent condensation of the terephthalic acid to solid form in the substantial absence of the contact material; the inclusion of gaseous hydrogen in the charge, and the preferred proportions of various components of the charge.

These and other features of the invention as well as its objects and advantages will be apparent to those skilled in the art upon consideration of the general and detailed disclosure hereinafter.

The instant method involves highly selective catalysis in which a high degree of conversion of the unwanted p-carboxybenzaldehyde occurs even though this substance is present in low concentration (e.g. usually less than about 2 percent of the crude material) and wherein there is a minimal conversion or degradation of the terephthalic acid undergoing purification; accordingly a good yield of a product of high purity is obtainable. This is accomplished by dispersing the crude solid terephthalic acid either by vaporization or by solution in a suitable solvent liquid and contacting the resulting dispersion at elevated temperature with both carbon monoxide and a Group VIII metal or other solid adsorptive agent which is capable of adsorbing a substantial amount of carbon monoxide under the reaction conditions; and this contact treatment is followed by recovery of the purified terephthalic acid. In many instances, hydrogen may desirably be introduced into the reaction mixture, particularly for prolonging the effective life of the contact. In the case of vapor state treatment, the use of an inert gaseous carrier material is often advantageous in facilitating the vaporization and transport of terephthalic acid, and steam is especially suitable for the purpose as it eliminates or minimizes any tendency toward dehydration at high temperatures of terephthalic acid to anhydride material which usually has an undesirable color.

In a preferred embodiment in which sublimation is utilized, the crude terephthalic acid is vaporized in a hot gaseous mixture containing a substantial proportion of superheated steam, a smaller amount of carbon monoxide and a still lower concentration of hydrogen; the resulting vapor mixture is contacted with palladium or another metal of Group VIII as the active catalyst or contact agent which is advantageously supported on an inert solid carrier material; then after separation from the catalytic material, the effluent vapor is cooled to effect fractional condensation of purified terephthalic acid in solid form while the uncondensed gaseous material containing most of the conversion products formed in the treatment is withdrawn.

Although terephthalic acid sublimes without melting, it becomes quite tacky and particles tend to agglomerate at temperatures of 450° F. and higher; therefore, it is preferable in vapor phase operations to charge the crude material in the form of finely divided particles in a nontacky condition, that is at ambient temperature or at an elevated temperature which is below the tackiness range, into a stream of entrainer or carrier gas which is flowing through a pipe or other conduit at a transport velocity whereby the solid acid particles immediately entrained and transported in suspension in the carrier gas.

In accordance with this invention, impure terephthalic acid is subjected to contact with an absorptive solid material that is capable of adsorbing a substantial amount of carbon monoxide and of selectively promoting the conversion of the minor amount of p-carboxybenzaldehyde present rather than conversion of the large amount of terephthalic acid present. The active component of the contact agent may comprise one or more of the metals of Group VIII of the Periodic Table of Elements in metallic or elemental form. Accordingly, the catalyst may be nickel or other metals of higher atomic number and higher molecular weight in that group, as exemplified by ruthenium, osmium, iridium, rhodium and platinum, along or in mixtures or in alloys with these or other metals. Palladium is preferred in the practice of this invention.

While a finely divided metal alone may be used as the contact material, its effectiveness is usually enhanced when it is disposed on solid particles of an inert carrier or support material as this generally produces a substantial increase in the surface area of active metal exposed to the reaction mixture. For example, a fine palladium powder typically has a surface area of about 30 square meters per gram, whereas in the extended form of a palladium-on-carbon catalyst, the surface area is about 120 square meters per gram of palladium. Carbonaceous materials such as activated carbon, powdered charcoal, etc. are particularly suitable supporting materials for the active component but various other inert carrier materials, as exemplified by alumina or silica-alumina, may also be used. The content of the active agent in the contact material may range from about 0.001 to 15 percent or more of the total weight, and very good results are obtainable with contact material containing from about 0.1 to about 10 percent by weight of palladium on powdered activated carbon. The preparation of such composite contact agents is well known and a sizable number are readily available in prepared form as they are frequently used in the catalytic processing of petroleum hydrocarbons, hydrogenation, etc. In some cases, it may be desirable to further lower the concentration of the active metal by mixing the composite catalyst with a large proportion of another inert substance such as sand, marble chips, glass beads, etc.

In this process, the contact agent may be employed as a fixed and still bed of solid particles through which the mixture containing carbon monoxide and the dispersion of crude terephthalic is flowing, or finely divided particles of the contact material of suitably small size may be suspended in and carried by either a gaseous or liquid stream containing the terephthalic acid. For illustration, solid particles of contact agent suspended in the vapor stream desirably have an average particle size smaller than 600 microns. Also, in vapor phase operations, the gaseous charge mixture may be passed through a fixed, dense phase fluidized bed of the contact agent; alternatively, it is possible to provide countercurrent contact of larger particles of the contact agent falling downwardly through a vapor charge flowing upward at a moderate velocity by selecting a contact material of suitable particle size and weight as well as using a sufficiently low gas velocity in a reaction chamber provided with means for charging particulate solids at the upper end and their removal at the lower end.

In fixed bed processing, two or more reaction chambers arranged in parallel may often be desirable so that continuous operations may be maintained by diverting the charge mixture to a second reactor while the bed of contact material in the first reactor is either being regenerated or replaced with a bed of fresh contact material.

When the treatment is carried out with the contact agent entrained or suspended in the dispersion of crude terephthalic acid, the solid contact agent can be introduced by any convenient method, such as by mixing it with the crude acid prior to vaporization, or by mixing it with the solution after the crude acid has been dissolved in a solvent for a liquid phase treatment, or by injecting it, together with either the carbon monoxide or entrainer gas or both.

Although carbon monoxide is essential in the process of this invention, it may often be employed in relatively small amounts. A substantial degree of p-carboxybenzaldehyde conversion or elimination is obtainable when only about 0.3 standard cubic feet (s.c.f.) of carbon monoxide is introduced per pound of crude acid charge. However, it is usually preferable to charge between about 1 and 10 s.c.f. per pound of the crude acid when a product of maximum purity is sought. Still larger proportions of carbon monoxide may be charged, and this is often advisable when gaseous hydrogen is included in the reaction mixture as described hereinafter. In instances where carbon monoxide is charged at a high rate, consideration should be given to recovering it from the reaction products and recycling it to the reactor unless a substantial supply of this gas is readily available at low cost. If necessary, the recycled carbon monoxide may be purified by such techniques as cooling and/or washing to condense and/or wash out any impurities which might tend to contaminate the terephthalic acid.

The carbon monoxide may be introduced as part of the gaseous carrier material for entraining crude acid particles or it may be charged directly into the reactor. Carbon monoxide already adsorbed on the contact agent may constitute the entire supply of carbon monoxide for relatively brief operating periods. For instance, the contact agent may be pretreated with carbon monoxide alone or in mixtures of nitrogen or steam containing as little as 5 mol percent carbon monoxide at temperatures of 250° F. and higher for periods ranging upward from 5 minutes to several hours prior to introducing the crude acid to be treated.

In fixed bed operations, a gradual decrease in p-carboxybenzaldehyde conversion has been observed as the operation progresses and this has been attributed to a decline in catalyst activity. While the specific cause of this effect has not been determined, it has been found that the catalyst activity and consequently the life of the contact material can be extended or prolonged greatly by incorporating hydrogen gas in the reaction mixture in an amount which is usually considerably less than the carbon monoxide but generally greater than about 0.2 s.c.f. per pound of crude acid. The decline in activity of the contact agent is considerably more pronounced when the terephthalic starting material is of relatively low purity, as exemplified by having a content of more than 1 percent p-carboxybenzaldehyde and an ash containing more than about 50 p.p.m. of cobalt calculated as the metal. In purifying these relatively impure crudes, it is usually desirable to include between about 1 and 10 s.c.f. of hydrogen per pound of crude acid in the charge mixture, and the volumetric or molar ratio of carbon monoxide to hydrogen in the reaction mixture is desirably above 10:1, and preferably above 20:1. The hydrogen may be introduced in the same manner as the carbon monoxide and when carbon monoxide is recycled back to the process, any hydrogen present will be a component of the recycle gas.

In vapor phase operations, it is generally desirable for a number of reasons to use a gaseous entrainer or carrier which is inert or nonreactive with the crude acid, the carbon monoxide and the catalytic material. The gaseous material is customarily preheated and thus provides at least part of the heat of sublimation of the crude acid. In addition, it is desirably introduced at transport velocity, that is a gas velocity sufficient to immediately entrain and transport the crude acid particles in a suspension of either the dilute or dense phase type. However, it is desirable to have the crude acid particles in dilute phase suspension at the time when most of the acid is vaporized, usually in a heated pipe coil, and this may be accomplished by introducing more of the gaseous entrainer downstream of the point where the crude acid particles were charged. During vaporization, the gaseous entrainer has another desirable effect in that its partial pressure lowers the temperature required for vaporizing terephthalic acid. Nitrogen or other inert gases may be utilized as the entraining agent, but steam, desirably in superheated form, is greatly preferred because the moisture therein minimizes the tendency of terephthalic acid to dehydrate at high temperatures and also from a standpoint of economy. The steam, of course, may be introduced in admixture with other inert gases. When steam is employed for the purpose, it is desirable to have at least about 0.03 mol of steam present per pound of terephthalic acid (5:1 steam:acid molar ratio). At the time most of the acid is vaporized, at least double this amount of steam is present in preferred embodiments of the invention. While the charging rate may be one or more mols of steam per pound of the acid, such high steam rates are generally uneconomical.

For vapor phase treatments, the reaction temperature should be maintained above the dew point of the gaseous reaction mixture and below the level at which substantial decomposition of terephthalic acid begins to occur. In general, temperatures of about 600° to 800° F. are suitable for the purpose. In the case of liquid phase treatments, temperatures in the range of about 75° to 550° F. may be utilized.

Vapor phase reactions according to the present process may be carried out over a wide range of elevated pressures extending up to 100 or more pounds per square inch gage pressure, but atmospheric or slight superatmospheric pressure are generally preferable to minimize the operating difficulties in these high temperature reactions. In the case of liquid phase treatments wherein the crude terephthalic acid is dissolved in water or a suitable organic solvent, such as acetic acid, a substantial superatmospheric pressure is maintained on the reaction vessel in order to keep the solvent in the liquid phase at the selected reaction temperatures.

The residence time for contact of the dispersion of the crude terephthalic acid with a solid contact agent and carbon monoxide is dependent upon a number of factors including the reaction temperature and the particular catalytic agent. In general, the residence time based on volumetric flow may be between about 0.01 and 10 seconds. In vapor phase treatments with a supported palladium catalyst either suspended in the gaseous charge mixture of blended with inert solid particulate material in a fixed bed, a residence time between about 0.1 and 5 seconds is preferable. As a general rule, it is desirable to correlate the contact or residence time with the reaction temperature in order to provide as low a reaction temperature as possible in order to eliminate any possibility of discoloring the terephthalic acid product.

Following contact treatment of the mixture containing the crude terephthalic acid, the treated material is preferably filtered before it is condensed. In process embodiments in which the contact agent is dispersed and carried by the mixture, such filtration is especially desirable in order not only to separate the contact material and ash from the purified acid product but also to accumulate a substantial layer or bed of particles of contact material on the filter surface. There are indications that substantial purification of the reaction mixture occurs during its passage through such a layer in the case of vapor phase treatments with entrained contact material. Any suitable filtering means can be employed for separation of the contact agent or other solid material from the treated vapor, with specific types including porous metal, woven metal screens, ceramic mesh and glass cloth filters.

Following contact with the contact solids and preferably after separation therefrom, e.g. by the aforedescribed filtration step, the vaporized terephthalic acid in the resulting vaporous product can be separated therefrom by condensation. Fractional rather than total condensation is preferred in order that the purified terephthalic acid may be recovered while most of the more volatile components of the treated vapor, particularly conversion products formed in the catalytic treatment, are withdrawn in the uncondensed vapor. Although condensation of the acid can be carried out by any suitable technique, including cooling by heat exchange, it is often desirable to bring about the desired condensation by combining a cooling medium with the mixture containing the vaporized terephthalic acid. Such a cooling medium should be inert to terephthalic acid at the temperatures encountered in the present process, and is advantageously similar in nature to the inert gaseous medium used in preferred embodiments of this invention. Thus, it is generally satisfactory to inject a sufficient quantity of a cooling medium in the form of a water spray and/or relatively low temperature steam into the vaporous product mixture containing the terephthalic acid vapor to condense a substantial proportion of the acid vapor therein without causing undesirable condensation of other constituents of the process stream, e.g., steam and impurities which remain in the vapor phase at temperatures lower than the condensation point of terephthalic acid. For example, a temperature of between about 350° and about 570° F., and more specifically between 400° and 550° F. is generally preferred when condensation is carried out at approximately atmospheric pressure, although the condensation can be carried out by cooling the vaporous product mixture to any temperature which is low enough to condense terephthalic acid from the mixture. Following condensation, the solid terephthalic acid product can be separated from the cooled mixture by any appropriate method, e.g., by the use of a cyclone separator, filter or bag collector.

The terephthalic acid thus separated after the aforementioned treatment with the contact solids has been found to contain substantially smaller amounts of the impurities than the quantities originally present in the crude terephthalic acid. For example, concentrations of para-carboxybenzaldehyde in crude terephthalic acid have in many cases been reduced by more than 95 percent by the instant process.

In treatments according to the present invention, small quantities of carbon dioxide and benzene have been found in the reaction products and, in at least some instances, the products contained a greater quantity of benzoic acid than was present in the charge. Also, there are indications that carbon monoxide is adsorbed on the contact agent at elevated reaction temperatures. However, this process should not be regarded as limited to any particular theory inasmuch as the reaction mechanism is not yet fully understood.

It is further contemplated that crude acid may be subjected to two or more of the contact treatments described herein in instances where the crude terephthalic acid contains an unusually high concentration of p-carboxybenzaldehyde or where a product of extremely high purity is sought.

DESCRIPTION OF SPECIFIC EMBODIMENTS

For a better understanding of the nature, objects and advantages of this invention, reference should be had to the following illustrative examples in which all proportions are set forth in terms of weight and all temperatures as degrees Fahrenheit unless otherwise indicated herein.

EXAMPLE 1

Crude terephthalic acid with a p-carboxybenzaldehyde content of 13,532 p.p.m. produced by the cobalt-catalyzed oxidation of p-xylene and composed of solid particles averaging about 50 microns particle size is introduced by means of a rotary feeder at ambient temperature and a charge rate of 35 grams per hour into a small conduit where it is entrained in a stream of superheated steam and carbon monoxide. The carbon monoxide is charged at a rate of 0.6 standard cubic feet per pound of crude terephthalic acid and the steam flow at about 650° F. and slight superatmospheric pressure (e.g., less than about 5 pounds per square inch gage pressure) amounts of 0.09 mol per pound of the crude acid (15:1 molar ratio). While being conveyed in suspension in the hot entrainer gas mixture, the solid particles of the crude acid are subjected to further heating while passing through a transfer line within a gas-fired furnace in which the catalytic reactor is located, and vaporization of the crude acid is complete prior to reaching the reactor.

Supported on a 200-mesh metal screen in the reactor is a fixed bed of 0.9 inch diameter and 6 inch depth containing 0.5 gram of a palladium-on-carbon catalyst in uniform physical admixture with 85 grams of glass beads of 470 micron average diameter to effectively disperse the catalyst. The active adsorptive agent or catalyst of the contact agent is the 5 percent palladium metal which is deposited on powdered activated carbon particles having an average size of the order of 40 microns in such manner as to provide an extended surface area of about 130 square meters per gram of palladium. Prior to charging the terephthalic acid vapor to the reactor, the contact mass is preheated to operating temperature while the entire apparatus is being purged with superheated steam. In the purification operation, the mixture of the carbon monoxide, steam and crude acid vapors flow downwardly through the contact mass which is maintained at an average temperature of 720° F., and the residence time, based on volumetric flow, of vapor in the bed is 1.2 seconds.

The effluent gaseous mixture from the reactor is subjected to essentially total condensation of its content of normally solid and normally liquid components by cooling first to a temperature of about 120° F. at atmospheric pressure in a water-jacketed condenser and then to about 80° F. in an air-cooled condenser from which the uncondensed vapors or gases are vented after passing through a filter paper which prevents the loss of any entrained solid particles.

After combining the material which collected in both condensers during the entire run, it is found that the total weight of solid material recovered amounts to 93.5 percent of the charge This product contains only 14 p.p.m. of p-carboxybenzaldehyde which is indicative of a 99.9 percent conversion of the latter substance during the treatment. A minor amount of product, 1.4 percent by weight, is water soluble and dissolves in a large excess of water at room temperature. The terephthalic acid recovery is 94.4 percent of the original terephthalic acid content of the charge.

EXAMPLE 2

Example 1 is repeated using the same feedstock under the same reaction conditions in all respects except for the pretreatment of a fresh batch of the same palladium-carbon-glass contact mass. Immediately prior to charging the acid to be purified, a mixture of equal volumes of carbon monoxide and superheated steam is passed through he catalyst bed for a period of one hour while the catalyst bed is maintained at a temperature of 500° F.; then the reactor is rapidly heated to bring the bed temperature up to 720° F. and the flow of the vapor mixture containing terephthalic acid into the reactor is started.

In this run, the solid product recovered amounts to 97.0 percent of the weight of the charge and it contains only 95 p.p.m. of p-carboxybenzaldehyde which is equivalent to 99.3 percent conversion of the latter substance; the water soluble material amounts of 1.59 percent. More significantly, the recovery of terephthalic acid is increased to 98.2 percent of the content of terephthalic acid in the crude acid charge. Thus, a more selective purification is obtained with considerably less of the undesirable degradation of terephthalic acid taking place in example 2 while the degree of conversion of the undesired p-carboxybenzaldehyde is similar to that of example 1.

In comparing examples 1 and 2, it is evident that a charge of only 0.6 s.c.f. of carbon monoxide per pound of terephthalic acid is insufficient for optimum purification. More importantly, the improved selectivity of example 2 is attributed to the presence in the reaction of additional carbon monoxide previously adsorbed on the palladium during the pretreatment and available from that source for a considerable period during the reaction. In view of the absence of vaporized crude acid during pretreatment, the pretreatment is of particular interest in indicating that a substantial amount of carbon monoxide is adsorbed on the solid contact agent.

EXAMPLE 3

Example 2 is repeated using another batch of the same catalyst pretreated in the same manner and employing the same reaction conditions except for increasing the carbon monoxide content of the gaseous entrainer mixture to 1.0 s.c.f. per pound of crude acid charged. The residence time is 1.3 seconds.

The results are generally similar to those obtained in Example 2 with the total recovery of solid material amounting to 97.3 percent and containing 135 p.p.m. of p-carboxybenzaldehyde and representing a 99 percent conversion of this impurity. The water soluble product amounted to 1.58 percent.

EXAMPLE 4

The procedure of Example 1 is repeated in all respects using a fresh batch of the same contact mass without pretreatment, except for increasing the carbon monoxide content of the entrainer gas to 8 s.c.f. per pound of the crude terephthalic acid. The residence time here is 1.0 second.

Excellent results are obtained with a total recovery of solids amounting to 99 percent, and there is 1.17 percent by weight of water soluble product. The solid product has a content of only 27 p.p.m. of p-carboxybenzaldehyde which is indicative of a conversion of 99.8 percent of this material. The terephthalic acid recovery amounts to 100 percent.

EXAMPLE 5

Using the same apparatus and 0.6 gram of the same 5 percent palladium on carbon catalyst mixed with 85 grams of the same glass beads without pretreatment, a crude terephthalic acid of higher purity is treated according to the present invention. This product of p-xylene oxidation has a lower p-carboxybenzaldehyde content of 1140 p.p.m. as well as about 0.8 p.p.m. of cobalt and 1 p.p.m. of iron (calculated as metals) in an ash content of about 50 p.p.m.

The crude acid is fed at a rate of 35 grams per hour into a stream containing 0.22 mol of superheated steam and 2.8 s.c.f. of carbon monoxide per pound of the crude acid. The residence time based on volumetric flow is 0.5 seconds as the gaseous reaction material flows down through the bed of contact material maintained at an average temperature of 705° F.

A highly selective purification occurs and a good yield is obtained as evidenced by a total solids recovery of 96.8 percent of material having a p-carboxybenzaldehyde content of only 52 p.p.m. (95 percent conversion) as determined after combining the entire solid condensates from both condensers at the end of a run of substantial duration. Terephthalic acid recovery amounts to 96.8 percent of the content of this material in the charge.

EXAMPLE 6

Example 5 is repeated with the same feedstock and a fresh batch of the same amount of contact material of the same palladium content and reaction conditions which differ only in the composition and flow rate of the gaseous material charged. Here the flow of the gaseous mixture supplies 0.8 s.c.f. of hydrogen, 5.3 s.c.f. of carbon monoxide and 0.25 mol of superheated steam per pound of crude acid charged.

The total solids recovery in both condensers is found to be 93 percent of the charge, the recovery of terephthalic acid is 93 percent and product contains only 34 p.p.m. of p-carboxybenzaldehyde (97 percent removal).

EXAMPLE 7

A low grade crude terephthalic acid with high contents of both p-carboxybenzaldehyde (1.4 percent) and ash containing 73 p.p.m. of cobalt (calculated as the metal) is purified in the same apparatus using a fresh batch of the same contact mass employed in example 5 without pretreatment.

The crude acid is charged at a rate of 21.8 grams per hour into a gaseous entrainer stream flowing at a rate which provides 2.1 s.c.f. of hydrogen, 62.6 s.c.f. of carbon monoxide and 0.52 mol of superheated steam per pound of crude acid. The adsorption bed is maintained at an average temperature of 705° F. and the vapor residence time therein amounts to 0.23 second.

In this run, the total solids recovery is 94 percent of a product with p-carboxybenzaldehyde content of 700 p.p.m. (equivalent to 95 percent conversion) and 97.1 percent of the terephthalic acid content of the charge is recovered.

Although the instant process has been illustrated by preferred detailed embodiments, it will be readily apparent to those skilled in the art that many modifications and variations may be employed within the scope of this invention. Accordingly, the present invention should not be construed as

We claim:

1. A process for the purification of terephthalic acid which comprises treating a crude terephthalic acid vapor containing a minor proportion of p-carboxybenzaldehyde in the presence of carbon monoxide by contact with a solid particulate adsorptive agent having a substantial carbon monoxide sorption capacity to produce purified terephthalic acid of substantially lower p-carboxybenzaldehyde content than said crude acid.

2. A process according to claim 1 in which gaseous hydrogen is present during said treatment and said adsorptive agent is situated in a fixed bed.

3. A process according to claim 1 in which said crude terephthalic acid is in the vapor state at an elevated temperature insufficient for the substantial decomposition of terephthalic acid during said treatment, and the treated gaseous product mixture is thereafter cooled to condense at least a substantial proportion of the terephthalic acid vapor as a purified solid.

4. A process according to claim 3 in which the charge contains at least about 0.3 s.c.f. of carbon monoxide, at least about 0.2 s.c.f. of hydrogen and at least about 0.03 mol of steam per pound of said crude acid in a mixture wherein the carbon monoxide: hydrogen molar ratio is at least about 20:1.

5. A process for the purification of terephthalic acid which comprises treating a crude terephthalic acid vapor containing a minor proportion of p-carboxybenzaldehyde by contact with a metal of Group VIII of the Periodic Table of Elements in the presence of carbon monoxide to produce purified terephthalic acid of substantially lower p-carboxybenzaldehyde content than said crude acid.

6. A process according to claim 5 in which gaseous hydrogen is present during said treatment.

7. A process according to claim 5 in which said metal is contained in a fixed bed.

8. A process according to claim 5 in which said metal comprises palladium supported on particles of an inert solid carrier material.

9. A process according to claim 5 in which said metal comprises palladium supported on finely divided carbon particles.

10. A process according to claim 5 in which the charge contains at least about 0.3 standard cubic foot of carbon monoxide per pound of said crude acid.

11. A process according to claim 5 in which the charge contains at least about 0.3 standard cubic foot of carbon monoxide and at least about 0.2 standard cubic foot of gaseous hydrogen per pound of said crude acid.

12. A process according to claim 11 in which the molar ratio of carbon monoxide and hydrogen in the charge is at least 10:1.

13. A process according to claim 5 in which said crude terephthalic acid is in the vapor state at an elevated temperature insufficient for the substantial decomposition of terephthalic acid during said treatment, and the treated gaseous product mixture is thereafter cooled to condense at least a substantial proportion of the terephthalic acid vapor as a purified solid.

14. A process according to claim 13 in which said metal is suspended in finely divided particulate form in the gaseous mixture during said treatment and thereafter separated from said mixture prior to condensing the terephthalic acid.

15. A process according to claim 13 in which said crude terephthalic acid vapor is mixed with a substantial amount of an inert gaseous substance.

16. A process according to claim 15 in which vaporized crude terephthalic acid is treated by contact at a temperature between about 600° and 800° F. and a residence time between about 0.1 and 5 seconds with an agent comprising between about 0.001 and 15 percent by weight of palladium supported in extended surface area form on finely divided carbon particles in the presence of at least about 1 s.c.f. of carbon monoxide, at least about 0.5 s.c.f. of hydrogen and at least about 0.06 mol of steam per pound of said crude acid in a mixture wherein the carbon monoxide: hydrogen molar ratio is at least about 20:1, and the resulting treated gaseous mixture is thereafter cooled in the absence of said agent to condense at least a substantial proportion of terephthalic acid vapor as a purified solid.